United States Patent
Baek et al.

(10) Patent No.: US 6,206,992 B1
(45) Date of Patent: Mar. 27, 2001

(54) METHOD FOR MANUFACTURING FIBROUS CERAMIC BY A ROOM TEMPERATURE EXTRUSION PROCESS AND A METHOD FOR MANUFACTURING FIBROUS MONOLITHIC CERAMICS USING THE SAME

(75) Inventors: Yong-Kee Baek; Do-Kyung Kim; Shi-Woo Lee; Jong-Gyu Paik, all of Daejon (KR)

(73) Assignee: Agency for Defense Development, Daejon (KR)

( * ) Notice: Subject to any disclaimer, the term of this patent is extended or adjusted under 35 U.S.C. 154(b) by 0 days.

(21) Appl. No.: 09/185,950

(22) Filed: Nov. 4, 1998

(30) Foreign Application Priority Data

Nov. 4, 1997 (KR) .................................................. 97-57887

(51) Int. Cl.$^7$ ........................... B32B 31/20; C04B 35/71; B28B 3/20
(52) U.S. Cl. ..................................... 156/89.11; 156/89.25; 156/89.27; 156/174; 156/264; 264/639; 264/640; 427/434.6; 427/443.2
(58) Field of Search ............................... 156/89.11, 89.25, 156/89.27, 174, 264, 175; 264/640, 638, 639, 682, 683, 681, DIG. 19; 427/434.2, 434.6, 443.2

(56) References Cited

U.S. PATENT DOCUMENTS

| | | | |
|---|---|---|---|
| 3,808,015 | * | 4/1974 | Seufert . |
| 3,953,561 | * | 4/1976 | Shin .......................... 264/DIG. 19 X |
| 4,071,594 | * | 1/1978 | Pearson et al. .......... 264/DIG. 19 X |
| 4,642,271 | * | 2/1987 | Rice . |
| 4,812,271 | * | 3/1989 | Koba et al. ............... 264/DIG. 19 X |
| 4,908,340 | * | 3/1990 | Frechette et al. . |
| 5,041,248 | * | 8/1991 | Renlund et al. . |
| 5,064,596 | * | 11/1991 | Chida et al. . |
| 5,198,302 | * | 3/1993 | Chyung et al. . |
| 5,645,781 | * | 7/1997 | Popovic et al. ....................... 264/239 |
| 5,827,797 | * | 10/1998 | Cass et al. ....................... 264/638 X |

FOREIGN PATENT DOCUMENTS 11-235711 * 8/1999 (JP) .

OTHER PUBLICATIONS

S.D. Nunn et al., *J. Am. Ceram. Soc.*, 76, No. 10, 2460–2464 (1993).
G.A. Brady, *Ceram. Proc. Sci. and Tech.*, 297–301.
S. Baskaran et al., *J. Am. Ceram. Soc.*, 76, No. 9, 2209–2216 (1993).

* cited by examiner

*Primary Examiner*—Curtis Mayes
(74) *Attorney, Agent, or Firm*—Scully, Scott, Murphy & Presser

(57) ABSTRACT

A fibrous ceramics fabrication method using a room extrusion process and a fibrous monolithic ceramics fabrication method using thereof is disclosed. The method includes the steps of obtaining a extrusion-purpose slurry by evenly mixing a hydrophilic cellulose bonding agent 3 to 7 and a hydrophilic organic plasticizer 5 to 20 for improving a formation property by softening the cellulose bonding agent with a distilled water 45 to 55, with regard to a weight percent 100 of a ceramic powders selected from a group of silicon nitride, silicon carbide and alumina, carrying out a room temperature extrusion from the extrusion-purpose slurry, and coating the fiber by passing through a mixedly dispersed coating-purpose slurry a ceramic powders 20 to 45 selected from a group of boron nitride and graphite, an organic dispersant 0.5 to 3 for the dispersing by forming a repulsive force between the ceramic grains within the non-aqueous solvent, and a bonding agent 2 to 10 for improving adhesivity and strength of the formed coating layer, with regard to a nonaqueous solvent 100, thereby enabling a fibrous monolithic ceramics having a structure inhibiting a catastrophic fracture of the ceramics to be easily fabricated in a lower cost.

12 Claims, 3 Drawing Sheets

METHOD FOR MANUFACTURING FIBROUS CERAMIC BY A ROOM TEMPERATURE EXTRUSION PROCESS AND A METHOD FOR MANUFACTURING FIBROUS MONOLITHIC CERAMICS USING THE SAME

BACKGROUND OF THE INVENTION

1. Field of the Invention

The present invention relates to an improved fibrous ceramics fabrication method by a room temperature extrusion shaping process and a fibrous monolithic ceramic fabrication method using the same.

2. Description of the Background Art

A fibrous monolithic ceramics serving as a target ceramic composite in the present invention has a construction in which a high hardness fibrous ceramics is enclosed by a ceramics boundary layer which is vulnerable to a shearing stress, so that a crack path that grows during a rupturing is deflected for thereby preventing a catastrophic fracture mechanism from occurring.

In general, the ceramics shows a good thermal, mechanical, and chemical characteristics, whereas it is sensitive to the existing defects and its fracture toughness is low, thereby exhibiting an catastrophic fracture mechanism and disadvantageously lowering its reliability when applied to a structural material. In order to effectively improve the fracture toughness of ceramics, there has been considered a fiber-reinforced ceramics in which a matrix phase is reinforced as a fiber having an improved mechanical property. The fiber-reinforced ceramics does not incur a stress concentration on a fractured portion thereof although the fracture occurs at a maximum stress thereof so as for the fiber to disperse the stress by supporting the load, whereby the catastrophic fracture mechanism which is witnessed in a general ceramics does not occur. Further, there appears a graceful failure mechanism in a load-displacement curve. Also, the matrix phase is preferentially fractured prior to the fiber fracture so that the fiber can play a bridge, and when the interface bonding of the fiber and the matrix phase becomes disconnected, the crack becomes deflected along the interface or the path becomes changed. Ultimately, there occurs a fracture such as a pull-out wherein it seems as if a fiber is pulled out. While passing through the above steps, the energy consumed for the fracture is increases, whereby the toughness becomes improved. However, the fiber-reinforced ceramics is expensive and requires longer composite fabrication process, thereby exhibiting its practical application.

Therefore, as a method for improving the ceramic toughness by using relatively simple steps, a ceramics composite concept has been proposed in which the ceramics having a high strength is formed into a plate shape or a fiber shape and the other ceramics that is weak to the shearing stress and relatively low in strength is introduced. In the material having such a structure, a fibrous or plate-like high strength polycrystalline ceramics becomes enclosed by the relatively weak ceramics, and when there grows a crack the path is deflected to the boundary layer and the fibrous or plate-like pull-out characteristic is induced to improve the fracture energy while preventing the catastrophic fracture mechanism.

FIG. 1 is a view illustrating a fibrous monolithic ceramics which is composed of an axially arrayed fibrous ceramics and a boundary layer ceramics.

In fabricating the material having such a structure, it is important to follow the steps wherein there is formed a fibrous or plate-like ceramics which is precise and whose thickness is adjusted, wherein the ceramics forming a weak boundary layer is spread, and wherein a stack is carried out to obtain a desirably shaped body.

In particular, in order to fabricate a large length-width ratio such as a fibrous ceramics required in the fibrous monolithic ceramics, a bonding agent is added to ceramic powders to improve the strength for maintaining its form, and a plasticizer is added to improve a flexibility, a forming property and a treatment facility of the shaped body.

As a method for fabricating the ceramics as a fiber formed shape, there have been employed a dry-spin method and a melt-spin method.

In the dry-spin method, the ceramic powders, a dispersant, a bonding agent and a plasticizer are admixed in a solvent, and the admixture is maintained at an appropriate viscosity, thereby being extruded by an extrusion machine and at the same time the solvent becomes rapidly evaporated using a dry zone of 85~110° C., thereby fabricating a fibrous ceramics. The above method, however, is not facilitating in modeling the fibrous slurry having an appropriate viscosity for the extrusion. Further, in order to improve the strength by removing the solvent within the extruded fibrous slurry, there is required a sudden dry for thereby resulting in a longer dry zone. Also, there is disadvantageously included a process in which the temperature should be raised using a thermal line. The dry speed of the extruded body formed in a cylindrical fiber shape is uniformed depending upon the location within the dry zone in the dry step, whereby the fibrous ceramics section becomes largely deviated from one fabricated by the dry extrusion.

FIG. 2 is a picture taken along a cross-section of the fibrous ceramics fabricated by a dry-spin method. As shown therein, the fibrous ceramics fabricated by the dry-spin method has a large degree of contraction in the fibrous thereof due to the solvent evaporation according to the sudden dry, and it does not maintain its circular shape resulting from its uneven state according to the position.

Meanwhile, as techniques for spreading the ceramics in which a boundary layer is included in the extruded fiber ceramics, there has been employed a method in which a coating-purposed slurry is released from above in a state where the fibrous ceramics is suspended for the spreading, or another method in which a extruded fibrous ceramics is passed through the coating-purposed slurry. The former has a disadvantage in that the coating layer thickness cannot be evenly maintained.

In the melt-spin method, the ceramic powders and the thermal plastic bonding agent are admixed while being heated and then being extruded, wherein a thermal plastic bonding agent having a plasticity resulting from a thermal effect is employed to thereby fabricate the extrusion-purpose slurry and it is maintained at a room temperature at the same time with the extrusion for thereby obtaining the plasticizing. In the above steps, there is required a temperature ranging from 170~180° C. in case of using polypropylene, and a temperature ranging from 180~190° C. in case of using ethylene vinyl acetate, for thereby assigning a plasticity by melting the bonding agent. The melt-spin method maintains a circular surface of the extruded fibrous ceramic, and the treatment strength and the plasticity are good and the spreading step can be easily applicable.

However, in the mulling process of the ceramic powders and the bonding agent, the temperature of the mixing machine should be disadvantageously raised so as to improve the plasticity of the bonding agent and the temperature should be disadvantageously precisely controlled so as to adjust the extrusion-purpose slurry viscosity for the product modeling.

SUMMARY OF THE INVENTION

The present invention is directed to overcoming the conventional disadvantages.

Therefore, it is an object of the present invention to provide a fibrous monolithic ceramics fabrication method having a structure for restraining catastrophic fracture of ceramics using further simplified steps than the conventional ones.

It is another object of the present invention to provide a method for easy extrusion a fibrous ceramics wherein an appropriate organic adding agent is selected in the step of forming a fibrous ceramics even during a fibrous monolithic ceramics fabrication to evenly admix the ceramic powders and the organic adding agent even at a room temperature.

To achieve the above-described objects, there is provided a fibrous ceramics forming method according to the present invention which includes the steps of obtaining a extrusion-purpose slurry by evenly mixing a hydrophilic cellulose bonding agent 3 to 7 and a hydrophilic organic plasticizer 5 to 20 for improving a formation property by softening the cellulose bonding agent with a distilled water 45 to 55, with regard to a weight percent 100 of a ceramic powders selected from a group of silicon nitride, silicon carbide and alumina, carrying out a room temperature extrusion from the extrusion-purpose slurry, and coating the fiber by passing through a mixedly dispersed coating-purpose slurry a ceramic powders 20 to 45 selected from a group of boron nitride and graphite, an organic dispersant 0.5 to 3 for the dispersing by forming a repulsive force between the ceramic grains within the nonaqueous solvent, and a bonding agent 2 to 10 for improving adhesivity and strength of the formed coating layer, with regard to a nonaqueous solvent 100.

Further, to achieve the above-described objects, there is provided a fibrous ceramics forming method according to the present invention which includes the steps of obtaining a extrusion-purpose slurry by evenly mixing a hydrophilic cellulose bonding agent 3 to 7 and a hydrophilic organic plasticizer 5 to 20 for improving a formation property by softening the cellulose bonding agent with a distilled water 45 to 55, with regard to a weight percent 100 of a ceramic powders selected from a group of silicon nitride, silicon carbide and alumina, carrying out a room temperature extrusion from the extrusion-purpose slurry, coating the fiber by passing through a mixedly dispersed coating-purpose slurry a ceramic powders 20 to 45 selected from a group of boron nitride and graphite, an organic dispersant 0.5 to 3 for the dispersing by forming a repulsive force between the ceramic grains within the nonaqueous solvent, and a bonding agent 2 to 10 for improving adhesivity and strength of the formed coating layer, with regard to a nonaqueous solvent 100, wounding on a mandrel and drying the coated extruded shaped body, severing and stacking the dried body, pressurizing the stacked material, and skimming and hot-pressing the obtained shaped body.

The objects and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying figures which are given only by way of illustration and thus are not limitative of the present invention, wherein.

DETAILED DESCRIPTION OF THE PREFERRED EMBODIMENTS

Figure 1:
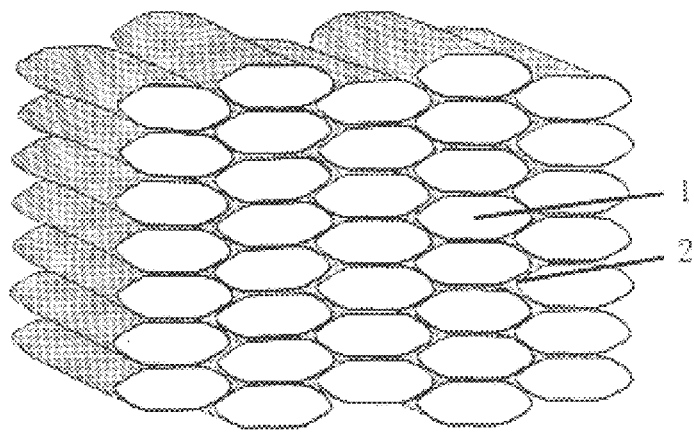
FIG. 1 is a view illustrating a fibrous monolithic ceramics formed in an axially arrayed fibrous ceramics and a boundary layer.
Figure 2:
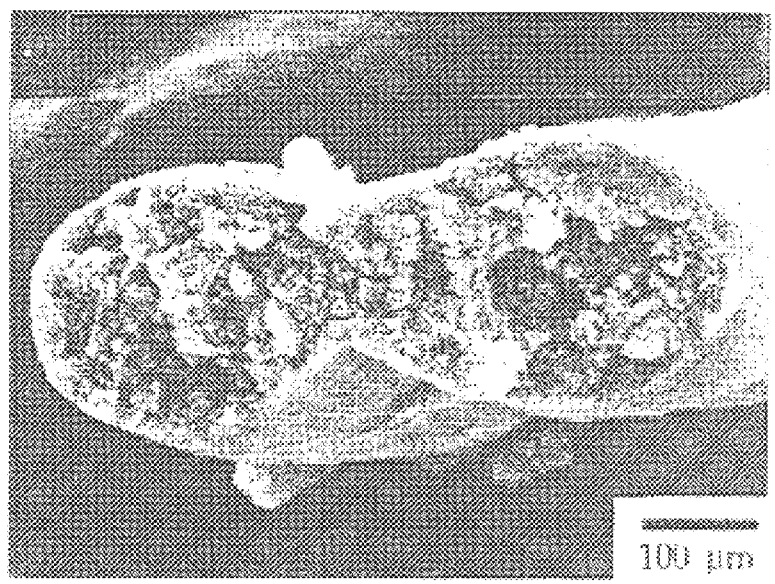
FIG. 2 is a picture taken by a scanning electron microscope with regard to a fibrous silicon nitride fabricated by a dry-spin method.

In the present invention, a ceramics extrusion was carried out in accordance with a room temperature extrusion process, and a fibrous monolithic ceramics was fabricated using the fabricated fibrous ceramics.

In order to form ceramics into a fibrous, the present invention employed an agent different from an organic adding agent used in the conventional dry-spin method and the melt-spin method to thereby adjust a working temperature to a room one while obtaining a circular fiber.

For the fibrous ceramics, there are used a silicon nitride, silicon carbide and alumina which show good mechanical properties. In order to sinter silicon nitride and silicon carbide, there are added sintering agents such as alumina, yttria for forming a eutectic liquid phase. For the sintering of alumina, it is desirable to add a grain growth inhibitor such as magnesia.

The extrusion-purpose slurry of the fibrous ceramics according to the present invention employs an aqueous solution as solvent, and a coating-purpose slurry in which boundary layer material is dispersed uses a nonaqueous solution.

In general, to prevent the organic adding agent included in the fibrous after coating the extruded ceramics from being dissolved, the two slurries have to use different solvents. That is, in case of coating-purpose slurry, since the dispersion of the ceramic powders determines the even thickness of the coated layer, there is employed a nonaqueous solvent for easy dispersion by use of the organic dispersant, and in case of extrusion-purpose slurry, it is advantageous to use an aqueous solution as solvent in consideration of the process.

It is desirable to include 45 to 55 weight percent (preferably 48 to 52) of distilled water as an aqueous solution with regard to 100 ceramic powders. Also, the aqueous water serves to improve plasticity within the extrusion-purpose slurry, whereby the amount of the added organic plasticizer can be decreased, thereby increasing stability in the subsequent skimming steps.

The cellulose bonding agents employed in the examples according to the present invention vary to methyl cellulose, hydroxylethyl cellulose, carboxymethyl cellulose, hydroxypropyl cellulose, hydroxypropyl methyl cellulose, with the exception of ethyl cellulose. The cellulose bonding agents exist in the aqueous solution as colloid having high viscosity and are softened by the organic plasticizer, thereby being appropriate in the mixing of the ceramic powders by using the aqueous solvent. The weight percent of the amount is desirable to be 3 to 7 (preferably 4 to 5) with regard to 100 ceramics powders. In particular, methyl cellulose and hydroxypropyl cellulose are gelled when heated so as not to be dissolved into the aqueous solution. However, they are liquidized at a room temperature so that an evenly mixed slurry can be fabricated only under the room temperature process.

The organic plasticizer added to improve the plasticity by softening the cellulose bonding agents include ethylene glycol group such as diethylene glycol, tetraethylene glycol, and polyethylene glycol which are dissolved in the aqueous, and glycerol. The weight percent of the amount is desirable to be 5 to 20 (preferably 9 to 12) with regard to 100 ceramics powders.

The process of fabricating the fibrous monolithic ceramics by forming ceramics into a fibrous by use of a room temperature extrusion method will now be described in further detail.

The above-described silicon nitride, silicon carbide and alumina are desirable as ceramic powders for being mixed into the extrusion-purpose slurry.

For the organic adding agents, there are employed a hydrophilic cellulose resin used as bonding agent, and a hydrophilic ethylene glycol used as plasticizer and glycerol.

The evenly mixed extrusion-purpose slurry using a roller mixer is formed into a diameter ranging 0.1~1 mm of long fiber shape by the extrusion process, and into a thickness ranging 0.1~2 mm of plate shape by the rolling process. The boundary layer material should be less strong than the ceramics in fibrous and plate-like and should be weak to a shearing stress. In order to satisfy such conditions, boron nitride and graphite can be the boundary materials.

The ceramics-dispersed coating-purpose slurry forming the boundary layer is fabricated using a nonaqueous solvent. In case of using a nonaqueous organic solvent, more than two solvents are mixed so as to adjust a dielectric constant, a surface tension and a boiling point. As a organic solvent, it is desirable to mix trichloroethylene and ethanol, and as a boundary material formed in the boron nitride and or graphite is desirable to be a weight percent of 20 to 45 (preferably 24 to 28) with regard to 100 solvent.

In order to disperse the ceramics to the nonaqueous solution, there should be added an organic dispersant which can carry out the dispersing by forming a repulsive force between the ceramic grains. A fish oil is appropriate for the dispersant, and the amount is desirable to be 0.5 to 3 (1 to 2) with regard to 100 solvent.

Also, there is required a bonding agent for improving the adhesivity and strength of the coating layer. Here, a polyvinyl butyral is appropriate for the bonding agent, and the amount is desirable to be 2 to 10 (preferably 4 to 6).

In order to coat the boundary layer slurry coating wherein a boundary layer material is dispersed to the fibrous and plate-like ceramics, there are provided a spray method and a dipping method. In the spray method, a compressed air is sprayed to the slurry to coat the boundary layer. In the dipping method, the fibrous and plate-like ceramics are passed through the slurry dispersed thereon by the boundary layer material for thereby carrying out the coating. The present invention enables the two methods and the dipping method advantageously facilitates the control of the coating layer thickness.

Figure 3:
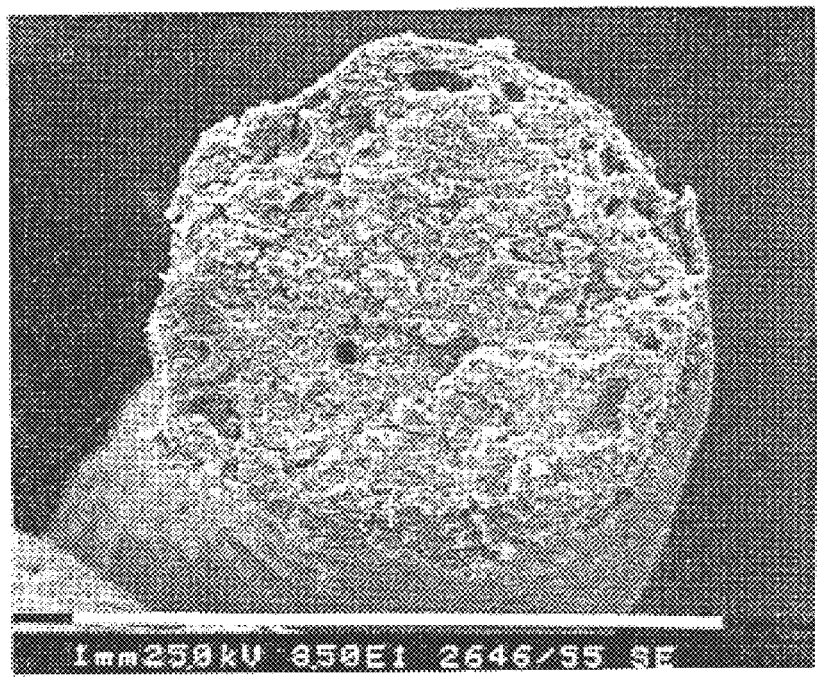
FIG. 3 is a picture taken by a scanning electron microscope with regard to a silicon nitride fibrous ceramics fabricated by a room extrusion process.

FIG. 3 is a picture taken by a scanning electron microscope of the state in which a boron nitride is coated by the dipping method on the fibrous silicon nitride obtained by the room temperature extrusion. The extrusion-shaped body coated on the boundary layer is dried for 1 to 12 hours at a room temperature while being wound on a film having a good heterostructure.

By adjusting the dry time period, a fibrous circular degree within the shaped body after the subsequent step of pressurized formation can be adjusted. When a dry body is obtained by the solvent evaporation, it is severed to a predetermined length and then the severed parts are arrayed in 0°/90°, 0°/45°/90°/135° and then stacked. The stacked material is pressurized using a press to obtain a shaped body. The shaped body is skimmed to remove the organic adding agent therefrom and a sintered body is fabricated by the hot pressing.

Figure 4:
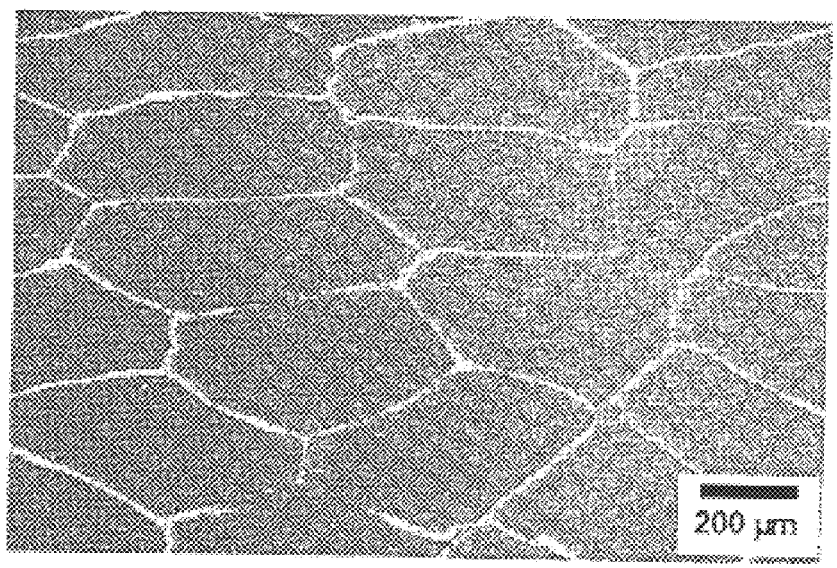
FIG. 4 is a cross-sectional view illustrating a fibrous monolithic ceramics formed of the silicon nitride fibrous and the boron nitride boundary layer according to the preferred examples of the present invention.

FIG. 4 is a cross-sectional view illustrating the fibrous monolithic ceramics formed by the fiber (silicon nitride and sintering agent) employed as an example.

As shown therein, a 4-point bending strength test is carried out from the fabricated sintering agent to thereby obtain a fracture strength and a load-displacement curve and evaluate the mechanical characteristics thereby. The fibrous monolithic ceramics is propagated along the growing boundary layer which is weak to cracking for thereby inhibiting the catastrophic fracture.

Figure 5:
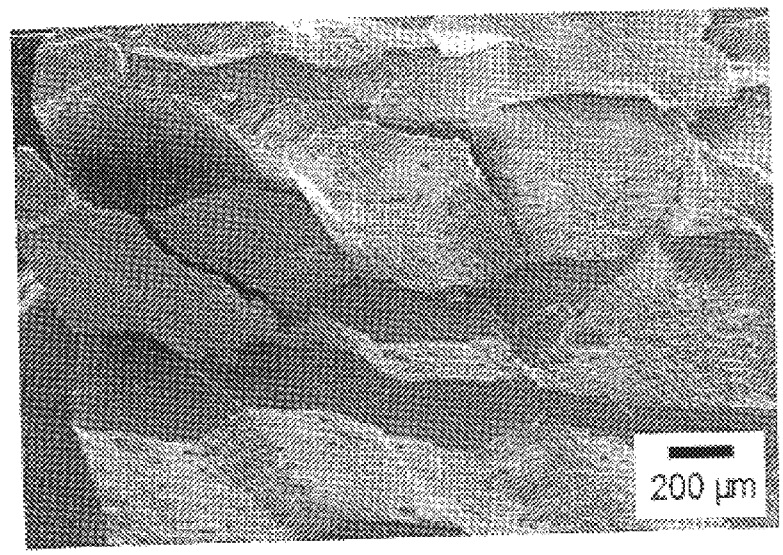
FIG. 5 is a cross-sectional view of graceful failure illustrating the fibrous monolithic ceramics formed of the silicon nitride and the boron nitride in FIG. 4.
Figure 6:
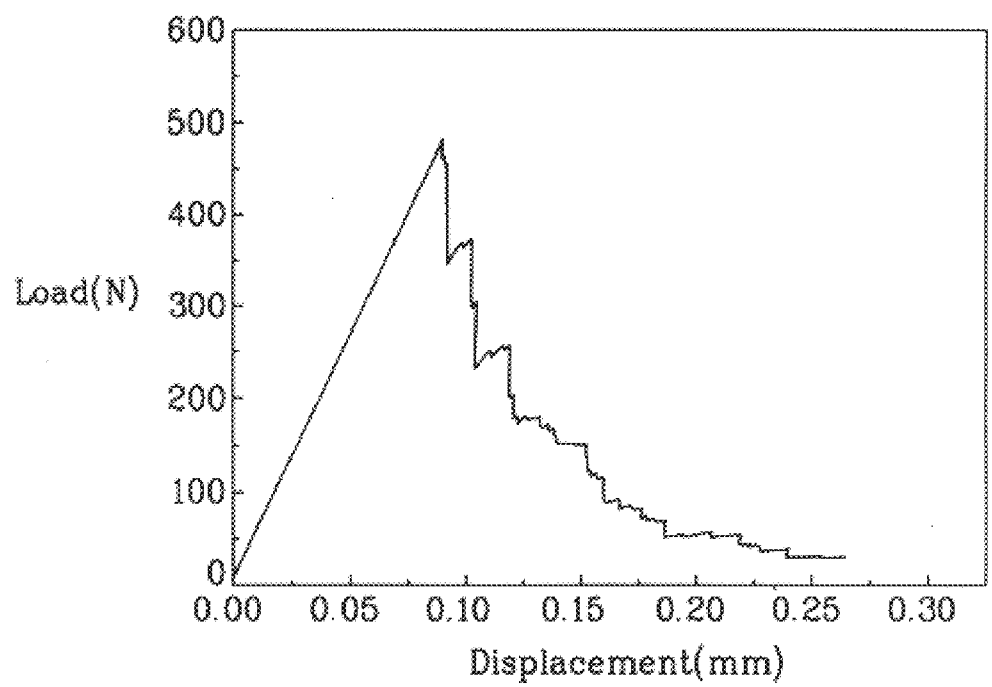
FIG. 6 is a graph illustrating a load-displacement characteristic recorded during the 4-point bending strength of the silicon nitride/boron nitride fibrous monolithic ceramics.

FIG. 5 is a cross-sectional view of graceful failure for the sintering sample illustrating a fibrous pull-out phenomenon. Also, in the fibrous monolithic ceramics, the fracture strength, fracture energy and load-displacement curve shape were varied depending upon the size of the fibrous and the thickness of the boundary layer, and the typical load-displacement curve is as shown in FIG. 6. As viewed from the curve, the fibrous monolithic ceramics continuously supports the load even after the initial fracture for thereby preventing the catastrophic failure of the ceramics, thereby realizing stability with regard to the existing faults and increased energy consumed for the fracture.

The present invention will be clarified in accordance with the subsequent examples.

EXAMPLES

Example 1

Silicon nitride powders 100 g including alumina 3 g and yttria 9 g as a sintering agent are added to distilled water 50 g dissolved by methyl cellulose 4 g and glycerol log so as to form a extrusion-purpose slurry and admixed using a roll mixer. The slurry is extruded using an oil pressure press apparatus through an 18-gage pinhole for thereby forming a fibrous ceramics. The cross-section of the fibrous ceramics after the dry was maintained a diameter 780 μm of circle.

Example 2

Using the same method as Example 1, a distilled water serving as solvent is being varied to 45 g and 55 g while carrying out the mixing and extrusion. In case the distilled water amount was 45 g, the viscosity of the extrusion-purpose slurry was increased so that the extrusion speed of the fibrous ceramics was lowered. In case the distilled water amount was 55 g, the viscosity of the extrusion-purpose slurry was decreased so that there was extruded a fibrous ceramics having a low shape-maintaining facility and a low strength.

Example 3

The method in Example 1 was repeated but the methyl cellulose amount as bonding agent was varied to 3 g and 7 g which were then admixed and the extrusion was carried out. When the amount of the bonding agent ranged 3~7 g, the fibrous ceramics was shaped.

Example 4

The method in Example 1 was repeated but the glycerol amount as plasticizer was varied to 5 g and 20 g which were then admixed and the extrusion was carried out. When the amount of the plasticizer ranged 5~20 g, the fibrous ceramics was shaped.

Example 5

The method in Example 1 was repeated but a 22-gage pinhole was employed for the extrusion. The cross-section of the fibrous ceramics after the dry was maintained as a diameter 300 μm of circle.

Example 6

In order to fabricate a coating-purpose slurry, there were dry-admixed a ceramic powders 20 g formed of boron nitride and alumina which were mixed in weight ratio of 85:15, a fish oil 1 g as dispersant, a polybutyral 5 g as bonding agent, and a solvent 100 g formed of trichloroethylene and ethanol which were mixed in weight ratio of 73:27. A thickness 30 μm of coating layer was formed by passing the fibrous ceramics which was extruded in Example 1 through the coating-purpose slurry.

Example 7

The method in Example 6 was repeated but the polybutyral amount as a bonding agent war varied to 2 g and 10 g so as to fabricate the coating-purpose slurry. When the amount of the bonding agent ranged from 2~10 g, the coating layer was formed.

Example 8

The method in Example 5 was repeated but the ceramic powders amount was varied to 45 g and the coating-purpose slurry was fabricated. The fibrous ceramics extruded in accordance with Example 1 was passed through the coating-purpose slurry, whereby a thickness 80 μm of coating layer was formed.

Example 9

The fibrous ceramics with its boundary layer coated was dried for 12 hours in the air and severed by a predetermined size and axially arrayed into a hexahedron, a disk and a hemisphere. The shaped body was raised at the rate of 2° C./min under nitrogen atmosphere and skimmed for 5 hours at the temperature of 800° C. The skimmed body was hot-pressed under a pressure of 25 MPa for one hour at the temperature of 1750° C. so that a fibrous monolithic ceramics including an oval fibrous ceramics was formed wherein the ratio of the major axis and the minor axis was 1:4.1.

Example 10

The method in Example 9 was repeated but the formation and skimming were carried out after a one-hour dry in the air. The skimmed body was hot-pressed so that a fibrous monolithic ceramics including an oval fibrous ceramics was formed wherein the ratio of the major axis and the minor axis was 1:5.4.

Example 11

The method in Example 9 was repeated but the fibrous ceramics was arrayed in a 0°/90° direction for the formation and then the skimming and hot pressing were carried out, thereby obtaining vertically arrayed fibrous monolithic ceramics.

Comparative Example 1

Silicon nitride powders 100 g including alumina 3 g and yttria 9 g as a sintering agent were admixed with a mixing solvent 60 g including toluene and isopropyl alcohol with a weight ratio of 31:69 and with KD-1 2 g as a dispersant. A first ball milling was carried out for 24 hours. There were added a polyvinylbutiral 8 g as a bonding agent and a polyethylene glycol 10 g as a plasticizer, and a second ball milling was applied to the admixture for two hours. The composition of the solvent, dispersant, bonding agent and plasticizer is as shown in Table 1. The admixed extrusion-purpose slurry evaporates the solvent and increases the viscosity by use of magnetic agitator. The slurry was extruded through the 22-gage pinhole using the compressed air and passed through a dry tube which maintains 80° C. Under the same condition, the fibrous ceramics was not continuously extruded.

Comparative Example 2

The method in Comparative Example 1 was repeated but MEK (methyl ethyl ketone) 60 g was employed as solvent to fabricate the extrusion-purpose slurry. Under the same condition, the fibrous ceramics was not continuously extruded.

Comparative Example 3

The method in Comparative Example 1 was repeated but SN7437 5 g as dispersant, polyvinyl butyral 10 g as bonding agent, and dibutylptalaid 12 g as plasticizer were employed to fabricate the extrusion-purpose slurry. Under the same condition, the variation degree becomes deteriorated with regard to the ceramic powders within the extrusion-purpose slurry so that the fibrous ceramics was not continuously extruded.

Comparative Example 4

The method in Comparative Example 1 was repeated but the polybutyral as bonding agent, dibutalate as plasticizer were employed in the respective amounts of 6 g, 8 g and 10 g, and the extrusion-purpose slurry was fabricated using 12 g and 10 g thereof, respectively.

When the bonding agent and the plasticizer was 6 g respectively, the fibrous ceramics was not continuously extruded. When the bonding agent and the plasticizer was 8 g respectively, the continual fibrous ceramics in the long fiber shape was fabricated.

As described above, the method according to the present invention allows a fibrous monolithic ceramics having a structure inhibiting a catastrophic fracture of the ceramics to be easily fabricated in a lower cost.

|  | Solvents (g) | Dispersants (g) | Bonding Agents (g) | Plasticizers (g) | R |
|---|---|---|---|---|---|
| Com. Ex. 1 | toluene/2PrOH (60) | KD-1(2) | PVB(8) | PEG(10) | * |
| Com. Ex. 2 | MEK(60) | KD-1(5) | PVB(8) | PEG(10) | * |
| Com. Ex. 3 | toluene/2PrOH (60) | SN7437(2) | PVB(10) | DBP(12) | * |
| Com. Ex. 4 | toluene/2PrOH (60) | KD-1(2) | PVB(6) | DBP(6) | * |
| Com. Ex. 5 | toluene/2PrOH (60) | KD-1(2) | PVB(8) | DBP(8) | ** |
| Com. Ex. 6 | toluene/2PrOH (60) | KD-1(2) | PVB(10 | DBP(10) | ** |
| Com. Ex. 7 | toluene/2PrOH (60) | KD-1(2) | PVB(12) | DBP(10) | ** |

(Here, R indicates "Extrusion Results",
*indicates "continual extrusion failed", and
**indicates "continual extrusion possible".)

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A method of forming a fibrous ceramic comprising the steps of:

preparing an extrusion-purpose slurry by evenly mixing 3 to 7 parts of a hydrophilic cellulose bonding agent and 5 to 20 parts of a hydrophilic organic plasticizer for improving formability by softening the cellulose bonding agent with 45 to 55 parts of distilled water and 100 parts of a ceramic powder, said ceramic powder selected from the group consisting of silicon nitride, silicon carbide and alumina, said parts being by weight of the extrusion-purpose slurry;

extruding the extrusion-purpose slurry at room temperature to obtain fibers; and coating the fibers by passing them through a mixedly dispersed coating-purpose slurry comprising 20 to 45 parts of a ceramic powder selected from the group consisting of boron nitride and graphite, 0.5 to 3 parts of an organic dispersant and 2 to 10 parts of a bonding agent for improving adhesivity and strength of the formed coating layer and 100 parts of a nonaqueous solvent, said parts being by weight of the coating-purpose slurry.

2. The method of claim 1 wherein a sintering agent is additionally admixed to form an eutectic liquid phase when silicon nitride or silicon carbide is employed as the ceramic powder of the extrusion-purpose slurry.

3. The method of claim 1 wherein a grain growth inhibitor is additionally admixed when alumina is employed as the ceramic powder of the extrusion-purpose slurry.

4. The method of claim 1 wherein a post-dried diameter of the ceramic fibers after extrusion is 0.1 mm to 1 mm.

5. The method of claim 1 wherein the bonding agent of the extrusion-purpose slurry is formed of a compound selected from the group consisting of hydroxyethyl cellulose, carboxymethyl cellulose, hydroxypropyl cellulose and hydroxypropyl methyl cellulose.

6. The method of claim 1 wherein the plasticizer of the extrusion-purpose slurry is formed of a compound selected from the croup consisting of diethylene glycol and glycerol.

7. The method of claim 1 wherein the bonding agent of the coating-purpose slurry is polyvinyl butyral.

8. The method of claim 1, wherein the dispersant of the coating-purpose slurry is fish oil.

9. The method of claim 1 wherein the solvent of the coating-purpose slurry is a mixed nonaqueous solvent of trichloroethylene and ethanol.

10. A method of forming a fibrous ceramic comprising the steps of:

preparing an extrusion-purpose slurry by evenly mixing 3 to 7 parts of a hydrophilic cellulose bonding agent and 5 to 20 parts of a hydrophilic organic plasticizer for improving formability by softening the cellulose bonding agent with 45 to 55 parts of distilled water and 100 parts of a ceramic powder selected from the group consisting of silicon nitride, silicon carbide and alumina, said parts being by weight of the extrusion-purpose slurry;

extruding the extrusion-purpose slurry at room temperature to obtain fibers;

coating the fibers by passing them through a mixedly dispersed coating-purpose slurry comprising 20 to 45 parts of a ceramic powder selected from the group consisting of boron nitride and graphite, 0.5 to 3 parts of an organic dispersant, 2 to 10 parts of a bonding agent for improving adhesivity and strength of the formed coated layer and 100 parts of a nonaqueous solvent, said parts being by weight of the coating-purpose slurry;

winding the coated fibers on a mandrel to dry the fibers and form a dried body;

severing the dried body to form severed dried bodies;

stacking severed dried bodies to form a stacked body;

pressure-forming the stacked body; and skimming and hot-pressing the stacked body.

11. The method of claim 10 wherein the severed dried fibers are arrayed in an axial orientation of 0°/90° or 0°/45°/90°/135°.

12. The method of claim 10 wherein the drying step is carried out for 1 to 12 hours so as to adjust a degree of circularity of a fibrous chase within a fibrous monolithic ceramic.

* * * * *